United States Patent [19]

George et al.

[11] 4,428,999

[45] * Jan. 31, 1984

[54] REFRACTORY COATED AND VAPOR BARRIER COATED FLAME RESISTANT INSULATING FABRIC COMPOSITION

[75] Inventors: Stephen George; Thomas H. George, both of Clinton, N.J.

[73] Assignee: Textured Products, Hartsdale, N.Y.

[*] Notice: The portion of the term of this patent subsequent to Nov. 9, 1999 has been disclaimed.

[21] Appl. No.: 338,850

[22] Filed: Jan. 12, 1982

Related U.S. Application Data

[63] Continuation-in-part of Ser. No. 294,771, Aug. 20, 1981, Pat. No. 4,358,500.

[51] Int. Cl.³ .......................... B32B 7/00; B05D 3/02

[52] U.S. Cl. ..................... 428/246; 428/251; 428/252; 428/254; 428/285; 428/286; 428/287; 428/343; 428/354

[58] Field of Search ............... 428/242, 246, 251, 252, 428/253, 254, 284, 285, 328, 329, 343, 354, 408, 446, 473.5, 480, 286, 287

[56] References Cited

U.S. PATENT DOCUMENTS 4,282,284  8/1981  George ........................... 428/251
4,358,500 11/1982  George et al. .................. 428/285

*Primary Examiner*—William J. Van Balen
*Attorney, Agent, or Firm*—Scully, Scott, Murphy & Presser

[57] ABSTRACT

Fabric base compositions having a refractory coating on one side and a coating of resin effective as a vapor and moisture barrier on the other side exhibit superior flame and heat resistance and superior dielectric properties in high moisture environments.

15 Claims, No Drawings

REFRACTORY COATED AND VAPOR BARRIER COATED FLAME RESISTANT INSULATING FABRIC COMPOSITION

CROSS REFERENCE TO RELATED APPLICATIONS

This is a continuation-in-part of commonly assigned U.S. patent application Ser. No. 294,771, filed Aug. 20, 1981 now U.S. Pat. No. 4,358,500 and is related to commonly assigned U.S. patent applications Ser. No. 294,770, filed Aug. 20, 1981; Ser. No. 225,888, filed Jan. 19, 1981; Ser. No. 073,362, filed Sept. 7, 1979, now U.S. Pat. No. 4,282,284; Ser. No. 931,121, filed Aug. 4, 1978, now abandoned, and three concurrently filed patent applications, the first relating to a refractory coated fabric composition prepared by plasma spraying, the second relating to a refractory coated/dielectric coated fabric composition and the third relating to a refractory coated/conductive layer coated fabric composition.

FIELD OF THE INVENTION

This invention relates to heat and flame resistant, flexible, insulating fabric compositions. More particularly, it relates to refractory coated and vapor barrier coated base fabric compositions. This invention especially relates to refractory coated and vapor barrier coated base fabric compositions wherein the refractory coating is formed on one side of the fabric and the vapor barrier coating is formed on the other side.

DESCRIPTION OF THE PRIOR ART

Asbestos and other thermal protection materials are employed as protective mats for welding operations, furnace linings, fire-resistant linings and the like to provide protection from flames and thermal extremes as well as for dissipation of heat at a high rate. Although in each application reasonable performance is obtained, the selected material has limitations in its range of uses and in its effectiveness, even in uses for which it is particularly adapted. In addition, asbestos has found less utility in certain uses because of recent findings that it may constitute a health hazard.

Ceramics and/or glass fibers have been used heretofore to prepare high temperature electrical insulating tape. In addition, coated fabrics and ceramic structures have been prepared with a combination of glass fiber fabrics and metal oxides.

U.S. Pat. No. 4,282,284 and commonly assigned patent application Ser. Nos. 225,888 and 294,770 disclose a heat resistant, flexible, refractory, insulating fabric composition of a porous base fabric, preferably a knitted fiberglass fabric, coated with heat resistant refractory materials, such as alumina and zirconia, and an organic bonding agent, such as acrylic latex alone or admixed with colloidal silica. A polymeric coating, such as polyvinyl chloride, may be formed over the coated fabric to provide abrasion resistance to the composition. A feature of this composition resides in the fact that the refractory materials are bonded in the interstices as well as to the surface of the base fabric, such that a significant amount of the fabric's flexibility and stretch properties are retained. This fabric composition has a variety of uses and therefore may be employed as the dielectric in insulated electrical wire or cable, as protective mats and curtains in welding operations, as linings for fire resistant machine and appliance covers, as duct and pipe insulation, as wrappings for engine exhaust systems and the like. When this fabric composition is exposed to heat and high temperatures, the organic bonding agent containing the refractory materials will decompose, causing the refractory materials to fuse into the softened surface of the knit fiberglass base fabric, enabling it to withstand intense heat and elevated temperatures well beyond the norml melt temperature of the fiberglass fabric. The resulting fabric structure will have ceramic qualities and will not soften, melt, drip or lose its insulating properties.

Although the organic components of the bonding agent of these prior art fabric compositions may not produce a flame when exposed to a flame or the intense heat developed by a flame, i.e. temperature of 1750° F. and above, they will decompose at these temperatures resulting in some products of combustion in the form of smoke and fumes which may prove harmful to persons in the vicinity.

Commonly assigned patent application Ser. No. 294,771 discloses improved refractory coated fabric compositions which eliminate the products of combustion which may be formed with the fabric compositions described above. These improved fabric compositions are similar to those which produce products of combustion in all respects except that an inorganic bonding agent is substituted for the organic bonding agent of the prior art fabric compositions. When these fabric compositions with the inorganic bonding agent are exposed to high temperatures above about 1750° F., no products of combustion in the form of smoke or fumes are produced.

Another commonly assigned patent application, filed concurrently herewith, discloses the use of plasma spraying to form refractory coatings on base fabric. These coated fabric compositions differ from those disclosed in the above patent and patent applications in that plasma sprayed refractory coatings contain no added bonding agent. Further, the plasma spraying method permits the preparation of thinner refractory coatings than those of the prior art compositions.

The refractory coated fabric compositions disclosed in the commonly assigned patent and patent applications may be usefully employed, inter alia, as insulating tape for electrical conductors. Although these fabric compositions exhibit good dielectric properties under average service conditions, severe environmental conditions can significantly reduce the effectiveness of these compositions. For example, where exposed to high humidity conditions, such as those encountered in tropical environments, mining installations, and shorefront facilities and on marine and naval vessels, electrical systems employing these prior art compositions may short-circuit. The need for an electrical insulating composition which will function in such conditions is manifest.

In addition, the refractory coated fabric composition disclosed in the commonly assigned patent and patent applications are also employed in services where the refractory coating provides flame and fire protection to such underlying material, as machines, appliances, thermal insulation for ducts and pipe, varnish insulated motor windings and the like. However, these prior art fabric compositions do not protect these underlying materials from vapor or water damage. A composition which would provide fire and flame protection as well as vapor and water protection would be extremely useful.

It is an object of this invention to provide refractory coated fabric compositions having improved dielectric properties under high humidity and high moisture levels.

It is another object of this invention to provide compositions which may be usefully employed in insulating electrical conductors and which will exhibit superior flame and heat resistance properties and will function under extremely wet conditions.

It is a further object of this invention to provide a dual function fabric composition which will provide superior flame and heat protection as well as vapor and water protection to underlying objects and materials.

SUMMARY OF THE INVENTION

These and other objects of this invention have been achieved by forming a refractory coating on one side of a base fabric and a water and vapor barrier coating on the other side. (For convenience, the water and vapor barrier coating will be referred to hereinafter as a vapor barrier coating.)

The present invention relates to a heat resistant, flexible refractory insulating composition comprising:
(a) a base fabric;
(b) a refractory coating comprising refractory materials, said refractory coating formed on one side of said fabric and said refractory materials being capable of fusing with the base fabric at elevated temperatures; and
(c) a vapor barrier coating formed on the other side of said fabric.

DESCRIPTION OF THE PREFERRED EMBODIMENTS

The present invention is an improvement over the heat resistant, flexible, refractory, insulating fabric compositions disclosed in commonly assigned U.S. Pat. No. 4,282,284, patent applications Ser. Nos. 294,771, 294,770 and 225,888 and the commonly assigned concurrently filed, patent application disclosing refractory coated fabric compositions prepared by plasma sprayingg, the entire contents of said patent and patent applications being incorporated herein by reference.

Briefly, the fabric compositions of this invention have the same refractory coating, formed on one side of the porous base fabric, as that disclosed in the above patent and patent applications. However, to improve the water resistance properties of the composition, a vapor barrier coating is formed on the other surface of the fabric. In addition, an abrasion resistant polymer coating may be applied to the outer surface of the refractory coating. When the fabric composition is to be adhered to another surface or wrapped around an electrical wire or cable to provide an insulated conductor, an adhesive may be applied to the outer surface of the vapor barrier coating.

The compositions of this invention are utilized in those applications which require an article which must exhibit specific multi-functional properties. Flame and heat resistance together with water resistance properties are required where these compositions are employed as electrical insulation or for flame and fire protection in services where fire, heat and water damage would result in loss of power and/or communication or permanent damage to thermal insulation, costly equipment or other underlying materials. Military installations, industrial plants and government crisis centers are examples of locations where these compositions can be effectively used. Although ideally a single material with the collective properties of these inventive products would be preferred, finding and providing such a material at a reasonable price is usually a difficult task. In the present situation, a multi-layered product can provide the desired properties at a reasonable cost while meeting all essential product specifications.

The base fabric employed in this invention may be composed of a material which is flame resistant, such as fiberglass. One particularly useful base fabric is constructed of a knitted fiberglass where fiberglass yarns comprise both the knit and lay-in yarns of the base fabric.

Satisfactory results have been obtained employing knit yarns comprised of DE type fiberglass with a yarn designation of DE-450-1/0 and fill or lay-in yarns comprised of fiberglass with a yarn designation of DE-450-1/0.

As will be understood by those skilled in the art, the knit fiberglass substrate fabric, though preferably formed of all fiberglass yarns, may be constructed with other kinds of fire resistant knit yarns or with only the weft lay-in yarn comprised of fiberglass. The substrate or base fabric may also be a woven fiberglass or a non-woven fabric of fiberglass.

As used herein the term "fabric" includes materials which are woven, knitted, non-woven or otherwise constructed from fibers. As explained in the related commonly assigned patent and applications, there must be an openness to the texture of the base fabric so as to permit the refractory coating to impregnate the surface of the fabric and fill, at least partially, some, if not all, of the interstices of the porous fabric when the refractory coating is applied by roller or knife coating techniques. Thus knitted fabrics are preferred when this procedure is employed. When the refractory coating is applied by plasma spraying in accordance with the concurrently filed, commonly assigned patent application, either woven or knitted fabrics may be used.

In addition to fiberglass, aramid yarns of Kevlar fibers may be employed in the base fabric. Base fabrics containing yarns of fiberglass and Kevlar fibers may also be employed. Further, base fabrics of quartz yarns or quartz yarns and Kevlar fiber yarns are useful. Similarly, non-woven webs or paper of ceramic fibers including alumina silica fibers, alumina fibers, zirconia fibers or mixtures thereof may serve as the base fabric in this invention. Details on these fabrics are presented in a concurrently filed and commonly assigned patent application directed to the plasma spraying preparation of fabric compositions, the contents of said application are incorporated herein by reference.

The vapor barrier coating which provides the superior water resistance properties exhibited by the compositions of this invention comprises a resinous layer effective to provide a barrier to water and vapors which could otherwise reduce the dielectric effectiveness of the compositions or cause damage to the underlying material.

The vapor barrier will function as a vapor barrier at sustained temperatures up to about 600° F. or for a limited time up to about 1000° F.

Materials which may usefully be employed to form the vapor barrier coating include resins which are moisture-proof and remain flame resistant until carbonization occurs. Useful resins include urethane resin, acrylic resin, epoxy resin, silicone resin and the like. Because of its low toxicity, silicone resin is particularly useful where the compositions of the inventions will be utilized in the vicinity of operating personnel. Particularly preferred resins are polyimide resin, polyamideimide resin and polyester resin. Useful polyimide resin and polyamideimide resin may be obtained from Rhone-Poulenc Chemical Co. of Monmouth Junction, N.J. under the tradenames Kerimid 500 and Rhodeftal 200, respectively. The coating should be formed on the base fabric in a layer thick enough to form a barrier to vapor, moisture and/or water. Coatings having a thickness of from about 1 to about 3 mils have been found to be effective.

The vapor barrier coating may be applied to the base fabric before or after the refractory coating is applied. Those skilled in the art will appreciate that the particular order in which the several coatings and layers are applied to the base fabric will be dependent on the particular fabrication techniques employed, the number of coatings and layers to be applied and the composition of the individual coatings and layers.

The refractory coating which is applied to the other side of the base fabric may consist of fused refractory materials formed thereon by plasma spraying as disclosed in one of the commonly assigned patent applications filed concurrently herewith or refractory materials plus an organic or an inorganic bonding agent as disclosed in the above described commonly assigned patent and patent applications, filed heretofore. The entire contents of U.S. Pat. No. 4,282,284, the concurrently filed patent application and patent applications Ser. No. 294,770 and 294,771 are incorporated herein by reference.

The refractory coating which is applied to the surface of the base fabric comprises heat resistant refractory materials which may be any of the usual known refractory materials in finely divided form which will fuse with the base fabric when subjected to elevated temperatures, e.g., above about 1250° F., for fiberglass and includes compounds of aluminum, calcium, chromium, magnesium, silicon, titanium, zirconium and the like, such as aluminum oxide, calcium oxide, magnesium oxide, silicon oxide, titanium oxide, zirconium oxide, aluminum silicate, calcium silicate, magnesium silicate, silicon carbide, zirconium carbide, alumina silica fiber and the like. Alumina, zirconia, calcium silicate and silicon dioxide are preferred, alone or in combination. These materials enable the compositions of this invention to maintain their heat insulating ability during prolonged exposure (about 20 minutes) to temperatures in the 1800°–2000° F. range.

In addition to these ceramic-type materials, other useful refractory materials may be employed to provide compositions which will withstand thermal shock at temperatures in the 4000° F. plus range. These refractory materials include, for example, zirconium oxide, silicon carbide, and thermal carbon black. This latter material is a non-electrical conducting form of carbon black which is resistant to thermal shock temperatures as high as 7000° F.

Plasma spraying is a well known process for forming metallic, refractory or ceramic coatings on substrates. When employed to provide refractory coatings on a non-rigid base fabric, this technique, as disclosed in the concurrently filed patent application, does not require the use of a bonding agent to form the refractory coating. The high temperature plasma causes the powdered refractory materials to become plastic or molten. This refractory material is then propelled to the base fabric where it solidifies, forming a coating on the surface of the fabric. The thickness of the film as well as the density of the coating can be closely controlled in this process. In fact, refractory films as thin as 1–1.5 mils may be laid down to provide a thin, lightweight product which is particularly useful in the aerospace and allied industries where weight and space are often of critical importance.

Alternatively, an organic or an inorganic bonding agent may be admixed with the refractory material and applied to the porous base fabric to provide a refractory coating. Useful organic bonding agents include acrylic latex resin alone or in combination with colloidal silica as disclosed in U.S. Pat. No. 4,284,284. Another bonding agent, disclosed in U.S. patent application Ser. No. 294,770, contains polyurethane resin and monoaluminum phosphate.

An inorganic composition, employed as the bonding agent, is disclosed in U.S. patent application Ser. No. 294,771 and comprises colloidal silica, monoaluminum phosphate and aluminum chlorohydrate. This inorganic composition is combined with the refractory materials to form the refractory coating. This coating is applied to the porous base fabric and then subjected to drying to cause the removal of water and a bonding of the refractory material to the porous base fabric. A saturation coating of the inorganic composition is then applied over the refractory base coating and dried. This saturation coating provides additional chemical bonding between the porous base fabric and the refractory materials creating a more secure bond of these refractory materials to the porous base fabric. Further, the saturation coating of the inorganic composition, when fully dried, provides a smooth surface to the fabric composition.

This inorganic composition is liquid and is formed from colloidal silica, monoaluminum phosphate and aluminum chlorohydrate. The latter two materials cannot normally be employed in combination since when they are combined the result is highly exothermic, producing a solid material which becomes adhesive. By employing the colloidal silica, which acts as a liquid moderator, the monoaluminum phosphate (MAP) and the aluminum chlorohydrate (ACH) may be used in combination to achieve the desired results. Further details regarding this inorganic bonding agent are presented in application Ser. No. 294,771.

One particularly preferred group of bonding agents for the refractory coating is the polyimide, the polyamideimide and the polyester resins disclosed herein as those which can usefully be employed in the vapor barrier coating.

A particularly useful refractory coating has the following formulation:

| Component | Parts by weight |
| --- | --- |
| Polyester Resin | 26 |
| Vital 200 solution | |
| 20% solids in Toluene | |
| Mfg. by: Goodyear Tire & Rubber Co. | |
| Akron, Ohio | |
| Aluminum Hydrate | 18 |
| SB 632 | |
| Mfg. by: Solem Industries | |
| Atlanta, Georgia | |
| Alumina Silica Fiber | 20 |
| Fiberfrax (ball milled) | |
| Mfg. by: The Carborundum Co. | |
| Niagara Falls, New York | |

| -continued | |
|---|---|
| Component | Parts by weight |
| Total parts | 64 |

A refractory coating, particularly useful with fiberglass fabrics for use at high temperatures, has the following formulation:

| Component | Parts by Weight |
|---|---|
| Polyamideimide Resin | 40 |
| Rhodeftal 200 | |
| Mfg. by: Rhone-Poulenc Chemical Co. | |
| Monmouth Junction, N.J. | |
| Alumina Silica Fiber | 20 |
| Fiberfrax (ball milled) | |
| Mfg. by: The carborundum Co. | |
| Niagara Falls, N.Y. | |
| Zirconium Oxide | 12 |
| Tam Zirox 250 | |
| Mfg. by: Tam Ceramics Inc. | |
| Niagara Falls, N.Y. | |
| Aluminum Hydrate | 10 |
| SB 632 | |
| Mfg. by: Solem Industries | |
| Atlanta, Georgia | |
| Silicone Fluid | 1 |
| Rhodorsil 48V750 | |
| Mfg. by: Rhodia Inc. | |
| Monmouth Junction, N.J. | |
| Total parts | 83 |

When this formulation is applied to fiberglass fabric, the resin itself will provide thermal protection up to about 1200° F. for short periods. By applying this refractory coating to fiberglass fabrics containing yarns of different sizes, for example, DE-450-1/0 and DE-150-1/0 yarns, the resultant fabric compositions provide thermal resistance in a step-wise fashion. From room temperature to about 500°-600° F., the resin provides essentially all the thermal protection for the fiberglass. Beyond about 500°-600° F., the fiberglass yarns soften and then fuse with the remaining components of the refractory coating—the thinner yarns softening at the lower temperatures, about 600° to about 900° F., with the heavier yarns softening at above 900° F. These particular fabric compositions will withstand impact temperatures of 1800°-2000° F.

Where the fabric composition will be subject to abrasive forces at ambient temperatures, a polymeric coating as described in the above commonly assigned patent and patent applications, may be applied over the saturation coating. In preferred embodiments, polyimide resin, polyamideimide resin or polyester resin is employed as the polymer coating instead of the polyvinylchloride disclosed in said patent and patent applications. This polymeric coating may be applied at a coating density of approximately 2 ounces per square yard, based on dry net weight, to improve the surface abrasion qualities of the fabric and to seal in and contain any refractory materials that may otherwise loosen from the fabric as it is stretched in the wire and/or cable wrapping process or subject to abrasion in use.

The polymer used in the polymeric coating should remain flame resistant until carbonization occurs. Polyvinyl chloride resin is one polymer which may be used in the polymeric coating. This coating is a mixture of selected plasticizers, stabilizers and modifiers, dispersion resins and oxides. A number of components are combined with the polyvinyl resin to provide the required properties of high temperature resistance and flexibility. One such polyvinyl chloride resin formulation is described in the above commonly assigned patent and patent applications which have been incorporated herein by reference. However, it is preferred that the polyimide resin, the polyamideimide or the polyester resin disclosed herein as being useful in the vapor barrier coating and the refractory coating be employed as the abrasion resistant polymeric coating.

When an adhesive is to be applied to the compositions of the invention to adhere to fabric composition to, for example, an electrical wire or a surface requiring heat and flame protection, the flameproof tape wrapping adhesive disclosed in U.S. Pat. No. 4,282,284 may be employed. The adhesive is applied to the outside of the vapor barrier coating so that the refractory coating will be on the outside providing protection to both the vapor barrier coating and the underlying material.

The fabrics prepared in accordance with this invention may be employed in the same manner as those disclosed in the commonly assigned patent and patent applications referred to hereinbefore. Thus, they may serve, for example, as electrical insulating tape, welding curtains and mats, pipe and dust insulation, fire resistant linings and the like where a material is required which is capable of enduring high temperatures and providing thermal protection, vapor and water protection and dielectric properties in high humidity conditions and areas of excessive moisture and dampness.

What is claimed is:

1. A heat resistant, flexible refractory insulating composition comprising:
   (a) a base fabric;
   (b) a refractory coating comprising refractory materials, said refractory coating formed on one side of said fabric, said refractory materials being capable of fusing with the base fabric at elevated temperatures; and
   (c) a vapor barrier coating formed on the other side of said fabric wherein said vapor barrier coating is urethane resin, acrylic resin, epoxy resin, silicone resin, polyimide resin, polyamideimide resin, or polyester resin.

2. A composition according to claim 1 wherein said refractory coating is formed on said base fabric by plasma spraying.

3. A composition according to claim 1 wherein said refractory coating additionally comprises a bonding agent and said composition includes the following additional element:
   (d) a saturation coating formed on the outside surface of said refractory coating, said bonding agent and said saturation coating being an inorganic composition comprising colloidal silica, monoaluminum phosphate and aluminum chlorohydrate.

4. A composition according to claim 1 wherein said refractory coating additionally comprises a bonding agent, said bonding agent being acrylic latex resin or acrylic latex resin and colloidal silica.

5. A composition according to claim 1 including the following additional element:
   (e) an abrasion resistance polymeric coating formed on the outside surface of said refractory coating.

6. A composition according to claim 5 wherein said refractory coating additionally comprises a bonding agent, said bonding agent and said polymeric coating being polyimide resin, polyamideimide resin or polyester resin.

7. A composition according to claim 1 including the following additional element:
   (f) an adhesive applied to the outside surface of said vapor barrier coating.

8. A composition according to claim 1 wherein the base fabric is a knitted fabric.

9. A composition according to claim 1 wherein the fabric is a woven fabric or a non-woven fabric.

10. A composition according to claims 8 or 9 wherein the base fabric is made from fiberglass yarn, Kevlar yarn or a mixture of fiberglass yarn and Kevlar yarn.

11. A composition according to claim 1 wherein the refractory materials are alumina, zirconia, calcium silicate, silicon dioxide or mixtures thereof.

12. A composition according to claim 1 wherein the refractory materials are silicon carbide or thermal carbon black.

13. A composition according to claim 1 wherein said base fabric is made from fiberglass yarns and said refractory coating comprises polyamideimide resin, alumina silica fiber, zirconium oxide and aluminum hydrate.

14. A composition according to claims 8 or 9 wherein the base fabric is made from quartz yarn or a mixture of quartz yarn and Kelvar yarn.

15. A composition according to claim 1 wherein the base fabric is a non-woven web or paper of alumina silica fibers, alumina fibers, zirconia fibers or mixtures thereof.

* * * * *

UNITED STATES PATENT AND TRADEMARK OFFICE
CERTIFICATE OF CORRECTION

PATENT NO. : 4,428,999
DATED : January 31, 1984
INVENTOR(S) : George, et al.

It is certified that error appears in the above—identified patent and that said Letters Patent are hereby corrected as shown below:

At Column 2, Line 7, delete "norml" and insert --normal--;
At Column 3, Line 41, delete "sprayingg" and insert --spraying--

On the title page the assignee should be changed from "Textured Products" Hartsdale, NY" to --Subtex, Inc., Hartsdale, NY--.

Signed and Sealed this

Seventh Day of August 1984

[SEAL]

Attest:

GERALD J. MOSSINGHOFF

Attesting Officer     Commissioner of Patents and Trademarks